United States Patent [19]
Zrostlik

[11] 3,927,778
[45] Dec. 23, 1975

[54] TIRE CHANGING APPARATUS
[75] Inventor: Francis L. Zrostlik, Garner, Iowa
[73] Assignee: Iowa Mold Tooling Co., Inc., Garner, Iowa
[22] Filed: Apr. 16, 1973
[21] Appl. No.: 351,776

[52] U.S. Cl. ............ 214/333; 214/75 H; 214/147 G
[51] Int. Cl.² ............................................ B65G 7/00
[58] Field of Search ...... 214/147 R, 147 AS, 147 T, 214/147 G, 75 H, 141, 330, 331, 332, 333, 650 R, 653, DIG. 4; 294/103 R, 103 CG; 212/42, 44

[56] References Cited
UNITED STATES PATENTS

| | | | |
|---|---|---|---|
| 2,725,996 | 12/1955 | Britton | 214/147 G |
| 2,840,254 | 6/1958 | Bevan | 214/147 G |
| 2,890,806 | 6/1959 | Pilch | 214/147 G |
| 2,903,294 | 9/1959 | Shook | 214/147 G |
| 3,278,218 | 10/1966 | Lebre | 294/103 R |
| 3,511,263 | 5/1970 | Emke | 214/653 |
| 3,695,467 | 10/1972 | Grundon | 214/147 AS |
| 3,709,390 | 1/1973 | Tanguay | 214/147 AS |

FOREIGN PATENTS OR APPLICATIONS

| | | | |
|---|---|---|---|
| 1,027,453 | 4/1966 | United Kingdom | 214/147 G |

*Primary Examiner*—Albert J. Makay
*Assistant Examiner*—Lawrence J. Oresky
*Attorney, Agent, or Firm*—Hofgren, Wegner, Allen, Stellman & McCord

[57] ABSTRACT

Tire changing apparatus adapted to be mounted on a vehicle for use in changing or repairing extremely large tires of the type frequently weighing several thousand pounds. The apparatus includes a boom including two boom elements, one telescopingly received within the other and a reciprocal motor for extending one relative within the other. The extendable boom element is pivotally connected to a tire changing fixture, and specifically, the base thereof. The base, in turn, pivotally mounts tire gripping members which may grip a tire about the periphery thereof. The base is also connected to the other of the boom elements by a link so that the orientation of the tire gripped by the tire gripping elements may be altered as necessary by rotating the tire gripping members on the base and by selectively extending or retracting the movable boom element.

6 Claims, 5 Drawing Figures

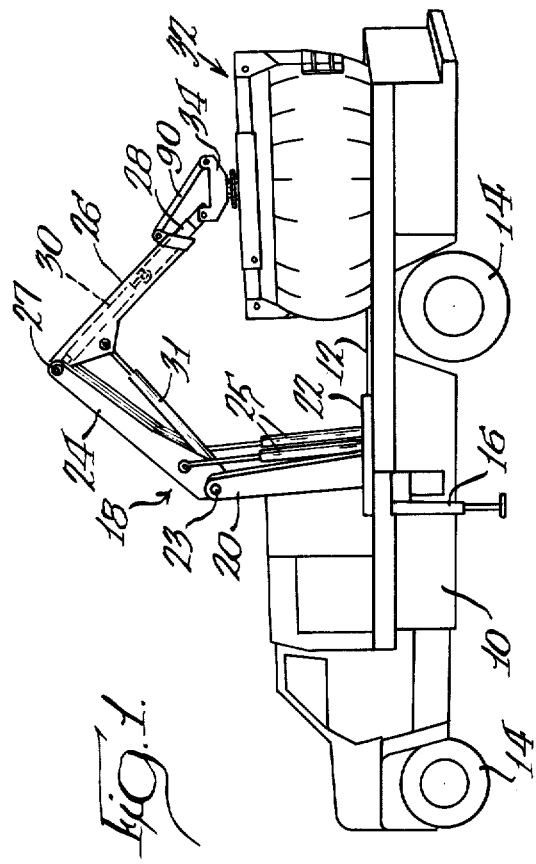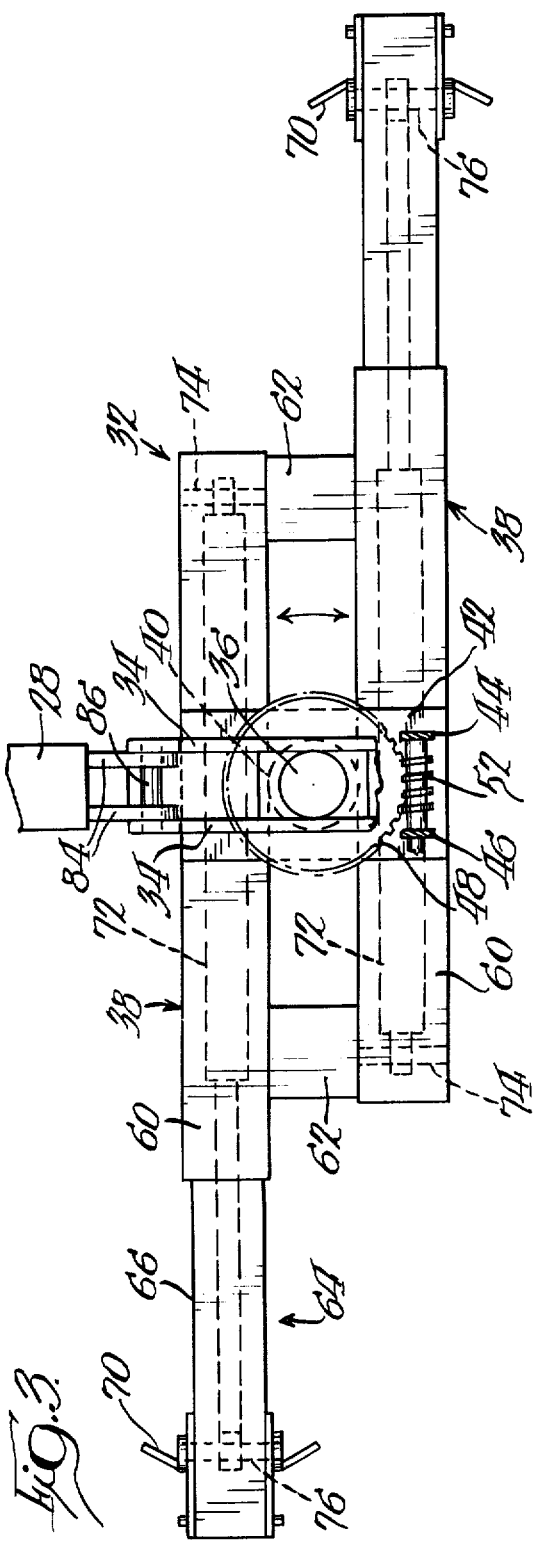

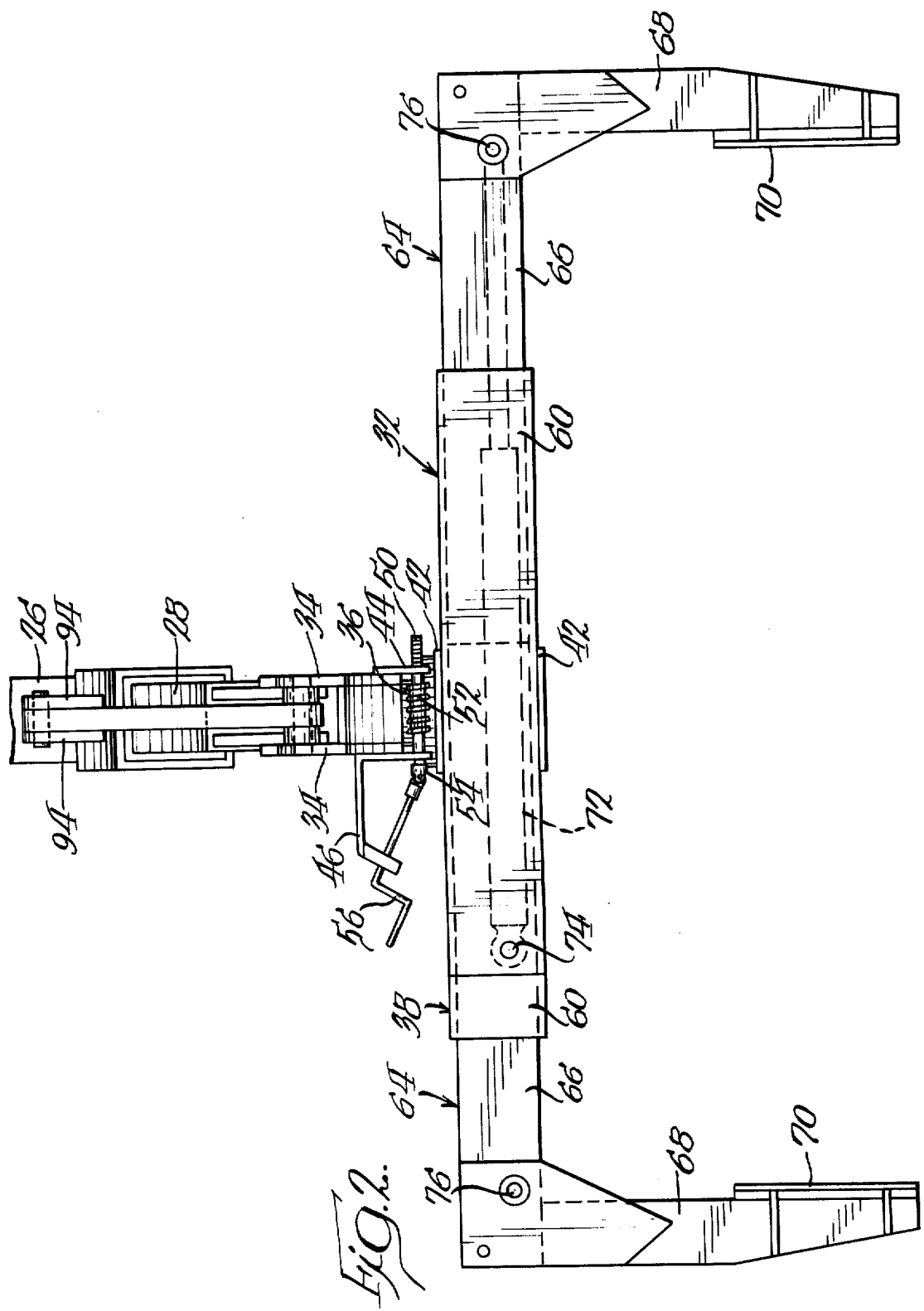

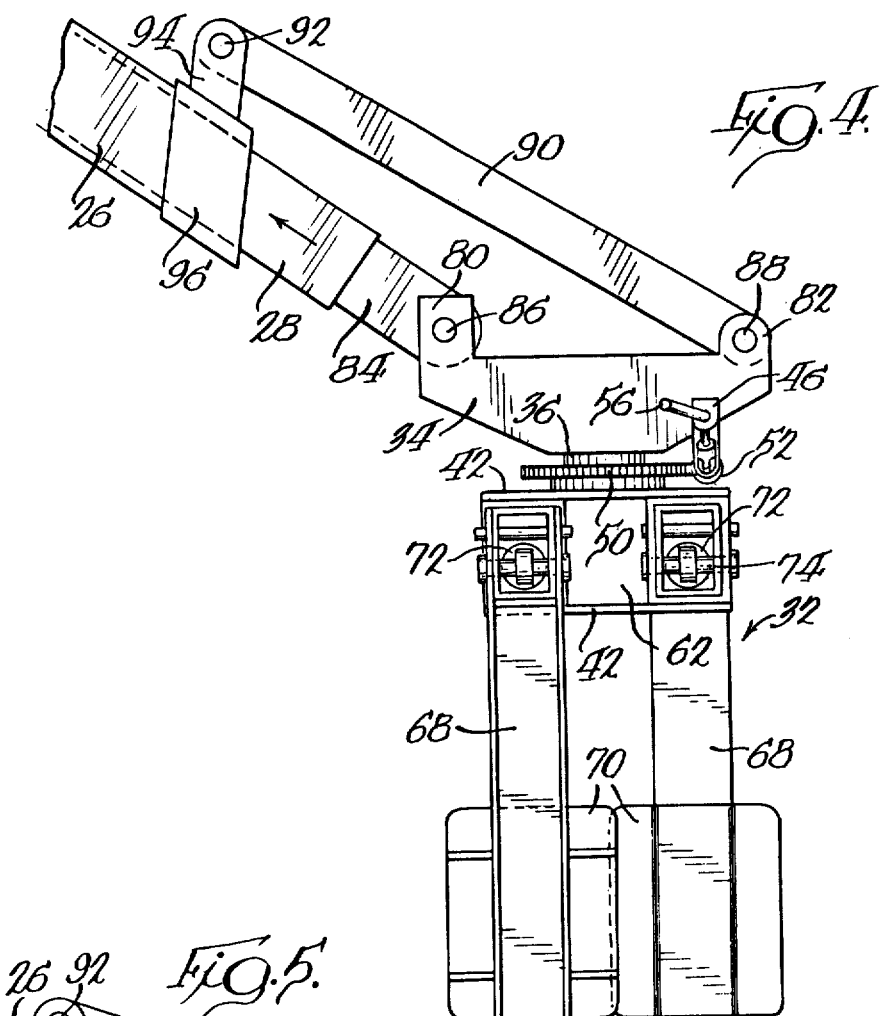
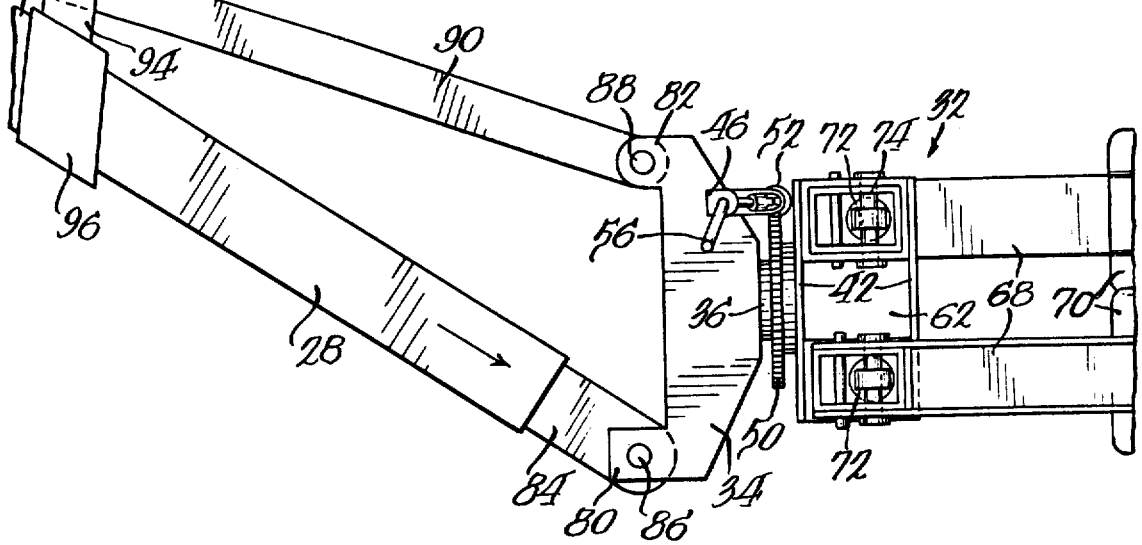

TIRE CHANGING APPARATUS

BACKGROUND OF THE INVENTION

This invention relates to tire changing apparatus and, more particularly, to tire changing fixtures for gripping tires of extremely large size and of the type frequently weighing thousands of pounds for removing the same from vehicles and/or manipulating the tires during a changing or repair operation.

Recent years have seen a substantial increase in the size of various off-the-road vehicles of the type generally employed in construction or mining operations as, for example, off-the-road high capacity trucks. As the load carrying capacity of such vehicles has been increased, it has also been necessary to increase the size of the tires of such vehicles to provide the capability for carrying the increased loads. As a result, there are vehicles in existence which are provided with pneumatic tires having diameters in excess of 10 feet and weighing several thousand pounds.

Such tires, as any other type of tire, require servicing but due to their bulk and weight, a great deal of effort is required. For example, substantial difficulty is encountered in mounting or demounting such tires on the vehicle as well as manipulating such tires during servicing when they are off of the vehicle.

The operation of remounting the tire on the vehicle is perhaps the most difficult of the operations involved in servicing such tires in that the mating securing means on the vehicle axle and on the tire rim must be aligned before the rim can be secured to the vehicle.

As the size and weight of a tire increases, the alignment requirement becomes substantially more difficult to perform because of the inability to easily correct small errors in alignment.

SUMMARY OF THE INVENTION

It is the principal object of the invention to provide a new and improved tire servicing apparatus. More specifically, it is an object of the invention to provide a tire servicing apparatus whereby extremely large and heavy tires may be easily manipulated during all phases of tire changing operations, which apparatus is relatively inexpensive to manufacture and therefore may be made more freely available.

The exemplary embodiment of the invention achieves the foregoing object in a construction including a boom which is adapted to be mounted on the bed of a truck. The boom includes plural boom elements including at least two elements defining a telescoping construction and which are located at the end of the boom. That is, one such boom element telescopingly receives the other. A reciprocal motor is employed to reciprocate one of the boom elements relative to the other.

The extendable boom element is pivotally connected to the base of a tire gripping fixture. The base of the fixture is also pivotally connected to a linkage which, in turn, is connected to the boom element telescopingly receiving the extendable boom element. As a result, by operation of the reciprocal motor, the attitude of the base may be changed as desired.

The fixture base also includes a means defining a pivot which, in turn, pivotally secures tire gripping members to the base. The pivotal axis of rotation of the last-mentioned pivot is transverse to the axis of rotation of the pivotal connection of the base to the boom element.

A gear, specifically, a spur gear, is mounted for rotation with the tire gripping members while the base mounts a gear in mesh with the spur gear, specifically, a worm gear. The worm gear is drivingly connected to a hand crank whereby the tire gripping members may be rotated about the aforementioned axis. The use of a spur gear and a worm gear provides a high friction coupling eliminating the need for lock means to hold the tire gripping members in any given position of rotation relative to the base.

The tire gripping members are defined by generally parallel, oppositely extending tubes receiving respective ones of L-shaped members. The base of each L-shaped member is provided with a tire gripping means and is slidably received in direct contact with the inner surface of a corresponding one of the tubes. Reciprocal motors are located in respective ones of the tubes for extending or retracting the corresponding L-shaped member.

As a result of the foregoing construction, the need for extensive hydraulic systems, precisely machined elements such as gears, bearings, etc., is minimized so that resulting tire changing apparatus can be fabricated relatively inexpensively.

Other objects and advantages will become apparent from the following specification taken in conjunction with the accompanying drawings.

DESCRIPTION OF THE DRAWINGS

FIG. 1 illustrates a vehicle mounting a tire changing fixture made according to the invention;

FIG. 2 is an elevation of a tire changing fixture made according to the invention;

FIG. 3 is a plan view of the tire gripping elements of the invention;

FIG. 4 is a side elevation of the tire changing apparatus showing the tire changing fixture at one attitude with respect thereto; and FIG. 5 is a side elevation of the tire changing apparatus showing the tire changing fixture in another attitude.

DESCRIPTION OF THE PREFERRED EMBODIMENT

An exemplary embodiment of the invention is illustrated in connection with a vehicle in FIG. 1. In particular, the invention may be employed with a vehicle such as a truck 10 having a bed 12 and wheels 14. Normally, the truck will be provided with steadying outriggers 16 of conventional construction which may be employed to engage the ground to steady the vehicle when a tire changing apparatus made according to the invention is in use.

Mounted on the bed 12 of the truck 10 is a boom, generally designated 18. The boom 18 includes a main mast 20 mounted on a platform 22 which, in turn, is rotatably mounted on the bed of the truck 12 in a conventional fashion so that the boom 18 may be rotated about a generally vertical axis. As is well-known, suitable motor means are typically employed to rotate the boom 18 about the aforementioned vertical axis.

At the upper end of the main mast 20 there is provided a boom element 24 which is pivotally connected to the upper end of the mast 20 by a pivot 23. Again, motor means 25 are typically provided to rotate the boom element 24 about its pivotal connection to the mast 20.

The end of the boom element 24 remote from the mast 20 includes a pivotal connection 27 to boom elements 26 and 28. The boom element 28 is dimensioned to be telescopingly received within the boom element 26, the latter being in the form of a tube. Motor means, such as a hydraulic cylinder 30, are located within the boom element 26 so that the boom element 28 may be selectively extending or retracted relative to the boom element 26. Again, the motor means 31 are employed to rotate the boom elements 26 and 28 relative to the boom element 24 about the pivotal connection 27 between the boom element 24 and the boom element 26.

The end of the boom element 28 includes a connection to a tire gripping fixture, generally designated 32 which, as will be seen, may be manipulated to grip a tire about its periphery to move the same as may be required.

Turning now to FIGS. 2 and 3, the tire gripping fixture 32 will be described in greater detail. The same includes a base defined by a pair of spaced plates 34. Secured between the plates 34 and extending exteriorly of one extremity of the two is a shaft 36 which serves to define a pivotal connection between the base defined by the plates 34 and a pair of tire gripping members, each generally designated 38. The end of the shaft 36 emerging from the plates 34 is received in a sleeve 40 which is mounted between a pair of plates 42 extending between the tire gripping members 38. As a result, the tire gripping members 38 are free to rotate about the shaft 36. Suitable means (not shown) are provided to retain the sleeve 40 on the shaft 36.

One of the plates 34 mounts a journal bracket 44 while the other of the plates 34 mounts a generally L-shaped bracket 46. A spur gear 48 is secured to the sleeve 40 for rotation therewith while a shaft 50 is journaled in the brackets 44 and 46 and mounts a worm gear 52 therebetween. The worm gear, in turn, is in mesh with the spur gear 48.

The end of the shaft 50 journalled in the bracket 46 is secured to a universal joint 54 which, in turn, is secured to a crank 56 also journalled in the bracket 46. As a result, rotation of the crank 56 will drive the worm gear 52 to in turn drive the spur gear 48 and rotate the tire gripping members 38 about the longitudinal axis of the shaft 36.

While it is not necessary that a worm and spur gear arrangement be employed, such is preferable because of the high mechanical advantage obtainable in a minimal amount of space with such an arrangement coupled with the fact that a spur and worm gear arrangement is, for all intents and purposes, self-locking as is well-known. Thus, once a desired position of rotation of the tire gripping members 38 relative to the base defined by the plates 34 has been achieved, the same will be maintained without a need for the provision of a separate locking means through the use of the spur and worm gear construction.

The tire gripping members 38 are oppositely directed so as to grip opposite sides of a tire, as illustrated in FIG. 1. With reference to FIGS. 2 and 3, each is defined by an elongated tube 60, preferably of rectangular or square cross section. As illustrated in FIG. 3, the tubes 60 are located on opposite sides of the pivot axis defined by the shaft 36 and, as best seen in FIG. 2, the tubes 60 are interconnected by the plates 42. Returning to FIG. 3, cross members 62 are interposed between the tubes 60 and secured thereto in any suitable fashion for additional strength.

Each of the tubes 60 slidably receives an L-shaped member, generally designated 64. Each L-shaped member 64 includes a long arm 66 of rectangular cross section and sized to be received in the respective tube 60 for slidable movement therein. On the short arm 68 of each L-shaped member, there is located a shallow V-shaped tire gripper 70 which is adapted to engage the cylindrical periphery of a tire.

Preferably, the long arms 66 of each L-shaped member 64 are formed of tubes and located within the tubes 60 and the tubes 66 is a reciprocal motor, normally in the form of a hydraulic cylinder 72. One end of each hydraulic cylinder 72 is pivotally connected as at 74 to the associated tube 60 while the opposite end is pivotally connected as at 76 to the long arm 66 of the corresponding L-shaped member, preferably near the junction of the long arm 66 and the short arm 68. As a result, extension or retraction of the cylinder rods is operative to move the tire grippers 70 towards and away from each other to grasp a tire about the periphery thereof.

Referring now to FIGS. 4 and 5, the base defined by the plates 34 is connected to the boom 18 as follows. Opposite ends of the plates 34 include apertured ears 80 and 82 respectively. The boom element 28 includes a tongue-like extension 84 which is pivotally connected by a pivot pin 86 between the ears 80 on the plates 34. A similar pivot pin 88 extends between the ears 82 to pivotally impale one end of a link 90. The end of the link 90 opposite from the pivot pin 88 is connected by a pivot pin 92 to a pair of upstanding ears 94 projecting upwardly from a collar 96 received on the end of the boom element 26 remote from the boom element 24.

As a result of the foregoing construction, it will be appreciated from a comparison of FIGS. 4 and 5 that the attitude of the base defined by the plates 34, and thus the tire gripping fixture 32, can be changed as desired through the expedient of extending or retracting the rod of the hydraulic cylinder 30 to extend or retract the boom element 28 relative to the boom element 26. This arrangement provides an effective, yet economical construction for changing the attitude of the tire gripping fixture 32 so as to move a tire at least between a horizontal orientation such as shown in FIG. 1 and a vertical orientation preliminary to replacing the same on the axle of a vehicle. It will also be recognized from the drawings that the axis of rotation for the tire gripping members 38 relative to the base defined by the plates 34 is transverse to the axis of rotation of the base on the boom. Thus, once the base 34 has been moved to the proper attitude for applying a tire to an axle, angular adjustment of the tire's position so as to align securing means on the vehicle with securing means on the tire rim can be simply achieved through rotation of the crank 56. And, of course, the entire boom can be rotated, extended, etc., for such other adjustments as may be required in tire position through appropriate operation of the cylinders 25 and 31.

It will therefore be recognized that a tire manipulating apparatus made according to the invention provides substantially all of the functions heretofore obtained with other, more complicated equipment. It will also be recognized that the goal of economical construction has been achieved in that the need for a hydraulic cylinder interconnecting the end of the boom with the base of the tire changing fixture customarily employed has been eliminated through the unique construction including the link 90 which takes advantage of the presence of the cylinder 30. Moreover, because the L-shaped members 64 are directly and slidably received within the tubes 60, and without the provision of bearings, further economy results.

Finally, the side-by-side disposition of the tire gripping members 38 provides maximum flexibility in terms of the size of the tires that can be handled. For example, the apparatus is susceptible to use with substantially smaller tires than could be handled if the tire gripping members 38 were disposed in an end-to-end relationship.

I claim:

1. Tire changing apparatus comprising: a motorized boom adapted to be mounted on the bed of a truck or the like, said boom including two pivotally interconnected, elongated arms, one of said arms including at least two relatively movable elements, one of said elements being telescopingly received by the other of said elements, and reciprocal motor means within said other element and connected to said one element for selectively extending or retracting said one element relative to said other element; a tire gripping fixture including at least two opposed tire gripping members movably mounted for movement towards and away from each other to grip the periphery of a tire and hold the same and pivotally connected to said one element for rotation about two mutually perpendicular axes; a link of fixed length pivotally connected to said other element; means pivotally connecting said link to said fixture at a location spaced from the pivotal connection of said fixture to said one element whereby the attitude of said fixture, and thus said tire gripping members, may be selectively altered through selective operation of said motor means to extend or retract said one element within said other element.

2. Tire changing apparatus according to claim 1 wherein said fixture includes a base, said base being pivotally connected to said one element for rotation about one of said axes and to said link, and means defining a pivotal connection between said base and said tire gripping members to mount said tire gripping members for rotation about the other of said axes.

3. Apparatus according to claim 2 wherein said means defining a pivotal connection between said base and said tire gripping elements includes a first gear mounted for rotatable movement with said tire gripping members and said base mounts a second gear in mesh with said first gear and further including a rotary crank having a handle and drivingly connected to said second gear.

4. Apparatus according to claim 3 wherein said first gear is a spur gear and said second gear is a worm gear.

5. Apparatus according to claim 2 wherein said tire gripping members comprise first and second generally parallel tubes symmetrically disposed on said base about said other axis; first and second L-shaped members telescopingly received in said first and second tubes respectively; tire gripping means on the base of each of said L-shaped members; and reciprocal motor means disposed within said tubes for slidably extending and retracting respective ones of said L-shaped members.

6. Tire changing apparatus according to claim 5 wherein said L-shaped members slidably engage the inner surface of associated ones of said tubes.

* * * * *